(12) United States Patent
Nihanda

(10) Patent No.: US 7,920,950 B2
(45) Date of Patent: Apr. 5, 2011

(54) VEHICLE DRIVE TORQUE ESTIMATION DEVICE AND DRIVE TORQUE ESTIMATION METHOD, AND FOUR-WHEEL DRIVE VEHICLE

(75) Inventor: Norihisa Nihanda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 979 days.

(21) Appl. No.: 11/797,540

(22) Filed: May 4, 2007

(65) Prior Publication Data

US 2007/0294018 A1 Dec. 20, 2007

(30) Foreign Application Priority Data

May 8, 2006 (JP) ................................. 2006-128879

(51) Int. Cl.
*G06F 17/00* (2006.01)
(52) U.S. Cl. ........................................................ 701/69
(58) Field of Classification Search ................. 701/69, 701/84, 87; 477/34, 107, 108
See application file for complete search history.

(56) References Cited

U.S. PATENT DOCUMENTS

| 4,866,618 | A | * | 9/1989 | Tamura et al. | ................ 701/101 |
| 5,041,978 | A | * | 8/1991 | Nakayama et al. | ............. 701/84 |
| 5,096,015 | A | * | 3/1992 | Akishino et al. | ............. 180/179 |
| 5,197,008 | A | * | 3/1993 | Itoh et al. | ........................ 701/70 |

FOREIGN PATENT DOCUMENTS

JP 60-011753 A 1/1985

* cited by examiner

*Primary Examiner* — Yonel Beaulieu
(74) *Attorney, Agent, or Firm* — Westerman, Hattori, Daniels & Adrian, LLP

(57) ABSTRACT

The estimated drive torque calculation unit, is configured such that if the running condition determination unit determines that the transmission mechanism is in gear, and if the speed of rotation of the output shaft of the torque converter measured by the rotation speed measurement sensor is equal to or less than a predetermined speed of rotation, and if the rotation speed of the wheels measured by the wheel speed sensor is equal to or greater than a predetermined rotation speed, the torque combination unit calculates the first estimated drive torque as the engine estimated drive torque even if the slip ratio of the torque converter is equal to or less than a predetermined value, and even if the first estimated drive torque calculated by the first drive torque calculation unit is greater than the second estimated drive torque calculated by the second drive torque calculation unit.

8 Claims, 6 Drawing Sheets

VEHICLE DRIVE TORQUE ESTIMATION DEVICE AND DRIVE TORQUE ESTIMATION METHOD, AND FOUR-WHEEL DRIVE VEHICLE

FIELD OF THE INVENTION

The present invention relates to a drive torque estimation device and drive torque estimation method, in which the engine drive torque is estimated by a plurality of means, the estimated drive torques calculated by each means are compared, and the estimated drive torque that is used in control of the vehicle is determined based on the result of the comparison.

The present invention further relates to a four-wheel drive vehicle that uses an engine for which torque estimation is carried out by this device or this method.

More particularly, the present invention relates to fail safe technology when an error occurs in the estimated drive torque determination process in this type of drive torque estimation device and drive torque estimation method.

BACKGROUND OF THE INVENTION

As a technology close to the present invention, the vehicle electronic control device as disclosed in Japanese Patent Application Laid-open No. S60-11753, is known. This control device includes, for example, an input shaft rotation sensor provided on the input shaft side of a transmission; a vehicle velocity sensor provided on the output shaft side of the transmission; a signal processing device that receives the output from each sensor and obtains the speed of rotation of the input shaft and the output shaft of the transmission; and a gear change ratio measurement device that determines the gear change ratio of the transmission. Also, when the gear change ratio measurement device detects that the gear change ratio is outside the mid position, and the output of one sensor indicates that the speed of rotation is greater than a predetermined value, and the speed of rotation output from the other sensor is low, the control device determines that the sensor with the low output has a breakdown. The control device then estimates the output value of the sensor with the breakdown from the output of the sensor without the breakdown and the gear change ratio measured by the gear change ratio measurement device. By using the estimated sensor output value in the transmission control in this way, the transmission operation enables safe driving to be carried out.

There are electronic controlled four-wheel drive vehicles having drive torque estimation devices including first drive torque calculation means, second drive torque calculation means, slip ratio calculation means, and torque combination means. The first drive torque calculation means calculates the estimated drive torque of the engine based on the amount of air taken into the engine. The second drive torque calculation means calculates the estimated drive torque of the engine based on the speed of rotation of the engine output shaft. The slip ratio calculation means calculates the slip ratio of the torque converter. The torque combination means calculates the combination drive torque by combining the first estimated drive torque calculated by the first drive torque calculation means and the second estimated drive torque calculated by the second drive torque calculation means in a predetermined proportion. In most operating conditions, the estimation accuracy of the first estimated drive torque is good. However, during vehicle start up (in other words, when the slip ratio of the torque converter is low) the estimation accuracy is not so good.

Therefore when the slip ratio of the torque converter is equal to or less than a predetermined value, the drive torque estimation device calculates the engine drive torque as the combination drive torque from the predetermined combination of the first estimated drive torque and the second estimated drive torque. Also, the distribution ratio of drive power to the front and rear wheels of the four-wheel drive vehicle is determined based on the highly accurate estimated drive torque calculated by the drive torque estimation device.

However, in the drive torque estimation device as described above, if there is a breakdown in the speed of rotation measurement sensor on the output shaft of the torque converter (in other words, the main shaft, which is the input shaft to the transmission) due to a broken cable or similar, the slip ratio of the torque converter will not be calculated correctly. For example, the slip ratio of the torque converter that is the subject of the calculation could be a constant zero. At this time the drive torque estimation accuracy becomes worse, as the second estimated drive torque is always included in the engine estimated drive torque, so driving safety could be reduced.

SUMMARY OF THE INVENTION

With the foregoing problems in mind, it is an object of the present invention to provide a vehicle drive torque estimation device and method that improves the running safety of a vehicle.

Also, it is an object of the present invention to provide a four-wheel drive vehicle that uses the drive torque estimation device and method.

To achieve these objects, in a vehicle (for example, the four-wheel drive vehicle 1 in the embodiments) having an engine, a torque converter connected to the output shaft of the engine, and a transmission mechanism that changes the speed of the output rotation transmitted from the engine via the torque converter and transmits the result to wheels (for example, the gear train 58 in the embodiments), a vehicle drive torque estimation device according to the present invention has first drive torque calculation means (for example, the first drive torque calculation unit 121 in the embodiments) for calculating the engine estimated drive torque based on an amount of air taken into the engine; second drive torque calculation means (for example, the second drive torque calculation unit 122 in the embodiments) for calculating the engine estimated drive torque based on the speed of rotation of the output shaft of the engine; slip ratio calculation means (for example, the slip ratio calculation unit 128 in the embodiments) for calculating a slip ratio of the torque converter; and torque combination means (for example, the torque combination unit 154 in the embodiments) for calculating a combination drive torque by combining a first estimated drive torque calculated by the first drive torque calculation means and a second estimated drive torque calculated by the second drive torque calculation means in a predetermined proportion, and the vehicle drive torque estimation device is configured such that if the slip ratio calculated by the slip ratio calculation means is equal to or less than a predetermined value, and if the first estimated drive torque is greater than the second estimated drive torque, the torque combination means calculates the combination drive torque as the engine estimated drive torque.

Also, the vehicle drive torque estimation device (for example, the estimated drive torque calculation unit 120 in the embodiments) has running condition determination means (for example, the running condition determination unit 155 in the embodiments) for determining whether the transmission mechanism is in gear or not; rotation speed measurement means (for example, the main shaft rotation speed measurement sensor 46 in the embodiments) for measuring the speed of rotation of the output shaft of the torque converter; and wheel speed measurement means (for example, the wheel speed sensor 13 in the embodiments) for measuring the rotation speed of the wheels, and the vehicle drive torque estimation device is configured such that if the running condition determination means determines that the transmission mechanism is in gear, and if the speed of rotation of the output shaft of the torque converter measured by the rotation speed measurement means is equal to or less than a predetermined speed of rotation, and if the rotation speed of the wheels measured by the wheel speed measurement means is equal to or greater than a predetermined rotation speed, the torque combination means calculates the first estimated drive torque as the engine estimated drive torque even if the slip ratio is equal to or less than a predetermined value, and even if the first estimated drive torque is greater than the second estimated drive torque.

Also, the four-wheel drive vehicle according to the present invention is a four-wheel drive vehicle in which both front wheels and rear wheels are drive wheels, wherein drive power distribution is carried out to the front wheels and the rear wheels based on the engine estimated drive torque calculated by the vehicle drive torque estimation device according to the present invention.

Furthermore, in a vehicle having an engine, a torque converter connected to the output shaft of the engine, and a transmission mechanism that changes the speed of the output rotation transmitted from the engine via the torque converter and transmits the result to wheels the vehicle drive torque estimation method according to the present invention is, a vehicle drive torque estimation method according to the present invention includes the steps of calculating the engine estimated drive torque based on an amount of air taken into the engine; calculating the engine estimated drive torque based on the speed of rotation of the output shaft of the engine; calculating a slip ratio of the torque converter; calculating a combination drive torque by combining a first estimated drive torque calculated based on the amount of air taken into the engine and a second estimated drive torque calculated based on the speed of rotation of the output shaft of the engine in a predetermined proportion; and calculating the combination drive torque as the engine estimated drive torque if the calculated slip ratio is equal to or less than a predetermined value, and if the first estimated drive torque is greater than the second estimated drive torque.

Also, the vehicle drive torque estimation method further includes the steps of determining whether the transmission mechanism is in gear or not; measuring the speed of rotation of the output shaft of the torque converter; measuring the rotation speed of the wheels; and calculating the first estimated drive torque as the engine estimated drive torque even if the slip ratio is equal to or less than a predetermined value, and even if the first estimated drive torque is greater than the second estimated drive torque in the case where the transmission mechanism is in gear, the speed of rotation of the output shaft of the torque converter is equal to or less than a predetermined speed of rotation, and the rotation speed of the wheels is equal to or greater than a predetermined rotation speed.

Furthermore, the four-wheel drive vehicle according to the present invention is a four-wheel drive vehicle in which both front wheels and rear wheels are drive wheels, wherein drive power distribution is carried out to the front wheels and the rear wheels based on the engine estimated drive torque calculated by the vehicle drive torque estimation method according to the present invention.

According to the vehicle drive torque estimation device and method of the present invention, if the transmission mechanism is in gear, and if the speed of rotation of the output shaft of the torque converter is equal to or less than a predetermined speed of rotation, and if the rotation speed of the wheels is equal to or greater than a predetermined rotation speed, if the slip ratio is equal to or less than a predetermined value, and if the first estimated drive torque is greater than the second estimated drive torque, the first estimated drive torque is calculated as the engine estimated drive torque. Therefore, even-if means for measuring the speed of rotation of the output shaft of the torque converter, which is necessary for calculation of the estimated drive torque (slip ratio), has a breakdown, and the measured value of the speed of rotation of the torque converter is zero, for example, the first estimated drive torque can be estimated with comparatively good accuracy. Therefore by using the first estimated drive torque, the drive torque measurement accuracy can be maintained high, and stable drive torque distribution can be achieved. Therefore, the running safety of the vehicle can be improved.

Also, according to the four-wheel drive vehicle of the present invention, the drive power is distributed to the front and rear wheels based on the engine estimated drive torque calculated in accordance with the present invention. Therefore, the running safety of the four-wheel drive vehicle can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Figure 2:
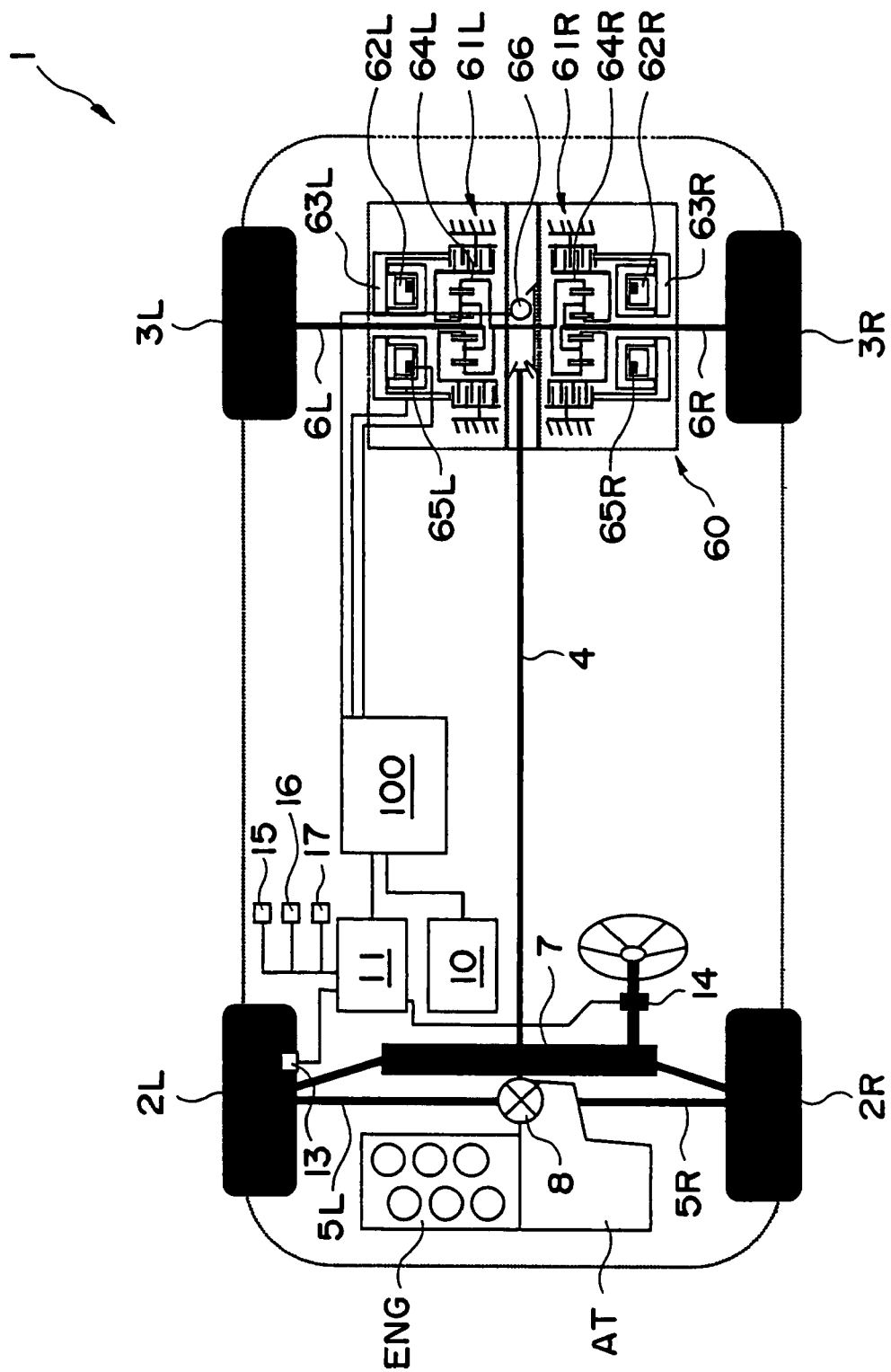
FIG. 2 is a schematic diagram of a four-wheel drive vehicle.

The following is an explanation of the preferred embodiments of the present invention with reference to the drawings. FIG. 2 schematically shows a four-wheel drive vehicle 1 having a drive torque estimation device according to the present invention. The four-wheel drive vehicle 1 includes left and right front wheels 2L, 2R, and left and right rear wheels 3L, 3R, which are the drive wheels; an engine ENG that drives the rotation of the front wheels 2L, 2R and the rear wheels 3L, 3R; an automatic transmission AT that transmits the rotational drive torque (rotational drive power) output from the engine ENG; a propeller shaft 4 that transmits the rotational drive torque (rotational drive power) output from the automatic transmission AT to the front wheels 2L, 2R and the rear wheels 3L, 3R; left and right front drive shafts 5L, 5R; and left and right rear drive shafts 6L, 6R.

Also, the four-wheel drive vehicle 1 includes a steering device 7 that changes the direction of the front wheels 2L, 2R, a differential mechanism 8, a drive power control device 60, several electronic control units (ECU) 10, 11, 100, and so on. The ECUs include an FI/AT-ECU 10, which controls the operation of the engine ENG and automatic transmission AT; an ESC-ECU 11, which is the vehicle behavior stabilization control system electronic control unit; and an 4WD-ECU 100, which distributes drive power to the front wheels 2L, 2R and the rear wheels 3L, 3R, and so on. The FI/AT-ECU 10, ESC-ECU 11, and 4WD-ECU 100 are electrically connected.

Also, wheel speed sensors 13 are provided on the front wheels 2L, 2R and the rear wheels 3L, 3R to measure the rotation speed (wheel speed) of each wheel. The wheel speed sensors 13 are electrically connected to the ESC-ECU 11. A steering angle sensor 14 is provided on the steering device 7 to measure the steering angle of the front wheels 2L, 2R. The steering angle sensor 14 is electrically connected to the ESC-ECU 11. Furthermore, the four-wheel drive vehicle 1 includes a yaw rate sensor 15 that measures the yaw rate, a lateral acceleration sensor 16 that measures the lateral acceleration, and a longitudinal acceleration sensor 17 that measures the longitudinal acceleration, each electrically connected to the ESC-ECU 11.

Figure 3:
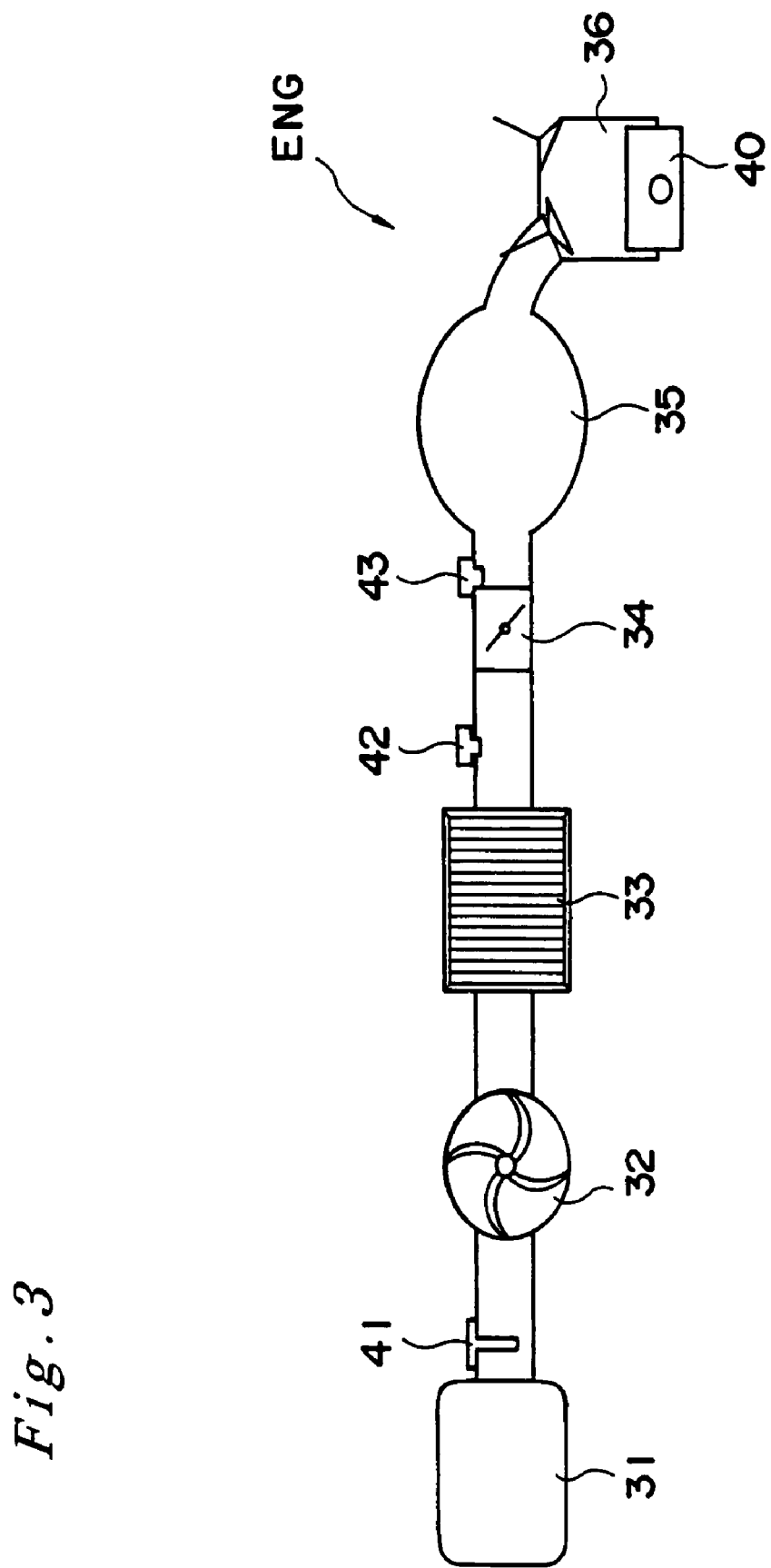
FIG. 3 is a schematic diagram showing the air intake system of the engine.

As shown in FIG. 3, the engine ENG includes an air cleaner 31 into which external air is drawn; a compressor 32 as a supercharger that compresses the air drawn into the air cleaner 31 and transmits the air to the engine ENG; an intercooler 33 that cools the air transmitted from the compressor 32; a throttle 34 that adjusts the amount of air taken into the engine ENG; and an intake manifold 35 that transmits air from the throttle 34 to cylinders 36 of the engine ENG. As can be understood from this, the engine is a supercharged engine.

An air flow meter 41 is installed in the channel between the air cleaner 31 and the compressor 32, to measure the amount of the air drawn into the air cleaner 31, in other words the amount of the air taken into the engine ENG. Also, a first pressure sensor 42 is installed in the channel between the intercooler 33 and the throttle 34, to measure the pressure of the air flowing between the intercooler 33 and the throttle 34. Also, a second pressure sensor 43 is installed in the intake manifold 35 to measure the pressure of the air flowing in the intake manifold 35.

Figure 4:
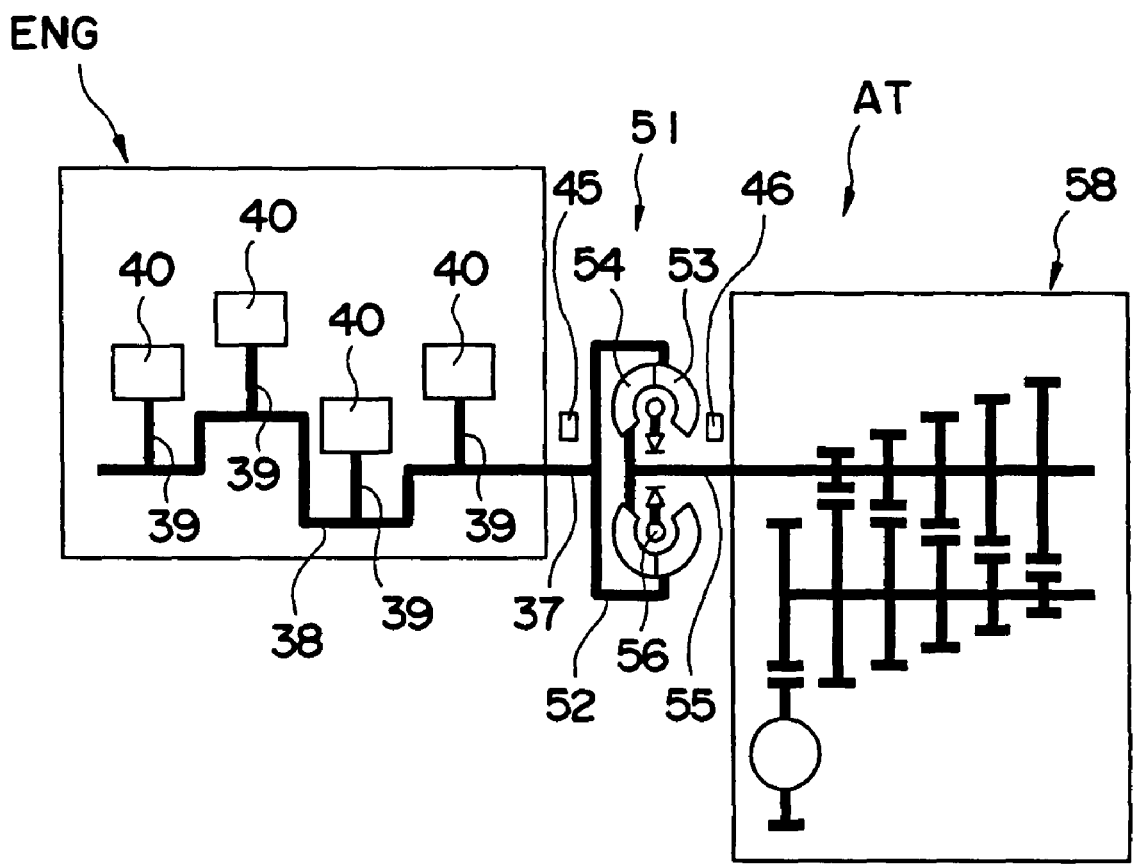
FIG. 4 is a schematic diagram of the engine and automatic transmission.

As shown in FIG. 4, the automatic transmission AT is connected to an output shaft 37 of the engine ENG. The output shaft 37 of the engine ENG is connected to a crankshaft 38 within the engine ENG. The crankshaft 38 is connected to pistons 40 within the cylinders 36 (see FIG. 3) via connecting rods 39.

As shown in FIG. 4, the automatic transmission AT includes mainly a torque converter 51 connected to the output shaft 37 of the engine ENG, and a gear train 58. The gear train 58 changes the speed of rotation of the output rotation from the engine ENG transmitted by the torque converter 51 and transmits the rotation to each wheel. The torque converter 51 includes a case 52 connected to the output shaft 37 of the engine ENG; an impeller 53 disposed within and connected to the case 52; a turbine 54 connected to a main shaft 55 that is the output shaft of the torque converter 51, disposed within the case 52; and a stator 56 disposed between the impeller 53 and the turbine 54 within the case 52.

When the output shaft 37 of the engine rotates, the case 52 connected to the output shaft 37 and the impeller 53 also rotate. In addition the turbine 54 and the main shaft 55 also rotate via oil that fills the case 52. Therefore, the rotational drive torque output from the engine ENG is transmitted to the gear train 58 via the torque converter 51. In other words, the output shaft 37 of the engine ENG becomes the input shaft of the torque converter 51. Also, an engine rotation speed measurement sensor 45 that (directly) measures the speed of rotation of the output shaft 37 of the engine ENG is disposed near the output shaft 37 of the engine ENG. The engine rotation speed measurement sensor 45 is electrically connected to the FI/AT-ECU 10.

The main shaft 55 is the input shaft of the gear train 58. When the main shaft 55 rotates, the speed of rotation is converted by a predetermined gear change ratio by the gear train 58, and transmitted to the front wheels 2L, 2R and the rear wheels 3L, 3R. A main shaft rotation speed measurement sensor 46 that (directly) measures the rotation speed of the main shaft 55 is disposed near the main shaft 55. The main shaft rotation speed measurement sensor 46 is electrically connected to the FI/AT-ECU 10.

Also, as shown in FIG. 2, the drive power control device 60 includes left and right multiple disk type brake clutches 61L, 61R connected to the propeller shaft 4 and the left and right drive shafts 6L, 6R; left and right electromagnetic coils 62L, 62R; left and right armatures 63L, 63R that activate the brake of the left and right brake clutches 61L, 61R; and left and right planetary gears 64L, 64R, connected to the left and right rear drive shafts 6L, 6R respectively.

The left and right electromagnetic coils 62L, 62R are electrically connected to the 4WD-ECU 100. When drive current flows from the 4WD-ECU 100 to the left electromagnetic coil 62L, the left armature 63L is pressed against and engages with the left brake clutch 61L by the electromagnetic force generated by the left electromagnetic coil 62L. Therefore the rotational drive torque of the propeller shaft 4 is transmitted to the left planetary gear 64L side, and clutch torque is generated in accordance with the engagement force. Then the clutch torque generated in the left brake clutch 61L is magnified by the left planetary gear train 64L and output to the left rear drive shaft 6L. As a result of the clutch torque the left rear drive shaft 6L and the left rear wheel 3L are driven to rotate. If drive current does not flow in the left electromagnetic coil 62L, the electromagnetic force is not generated, so the left brake clutch 61L is not engaged, and the clutch torque is not generated.

On the other hand, when drive current flows from the 4WD-ECU 100 to the right electromagnetic coil 62R, the right armature 63R is pressed against and engages with the right brake clutch 61R by the electromagnetic force generated by the right electromagnetic coil 62R. Therefore the rotational drive torque of the propeller shaft 4 is transmitted to the right planetary gear 64R side, and clutch torque is generated in accordance with the engagement force. Then the clutch torque generated in the right brake clutch 61R is magnified by the right planetary gear train 64R and output to the right rear drive shaft 6R. As a result of the clutch torque the right rear drive shaft 6R and the right rear wheel 3R are driven to rotate. If drive current does not flow in the right electromagnetic coil 62R, the electromagnetic force is not generated, so the right brake clutch 61R is not engaged, and the clutch torque is not generated.

Also, the drive power control device 60 includes left and right search coils 65L, 65R that measure the air gaps between the left or right electromagnetic coils 62L, 62R and the left or right armatures 63L, 63R respectively. The drive power control device 60 also includes an oil temperature sensor 66 that measures the temperature of oil within the drive power control device 60, installed in a predetermined location.

Also, drive torque output from the engine ENG is transmitted to the left and right front wheels 2L, 2R via the automatic transmission AT, the differential mechanism 8, and the left and right front drive shafts 5L, 5R. In addition, drive torque output from the engine ENG is transmitted to the left and right rear wheels 3L, 3R via the automatic transmission AT, the differential mechanism 8, the propeller shaft 4, the drive power control device 60, and the left and right rear drive shafts 6L, 6R. At this time, the distribution of drive power to the front wheels 2L, 2R and the rear wheels 3L, 3R is controlled by the 4WD-ECU 100 and the drive power control device 60.

Figure 5:
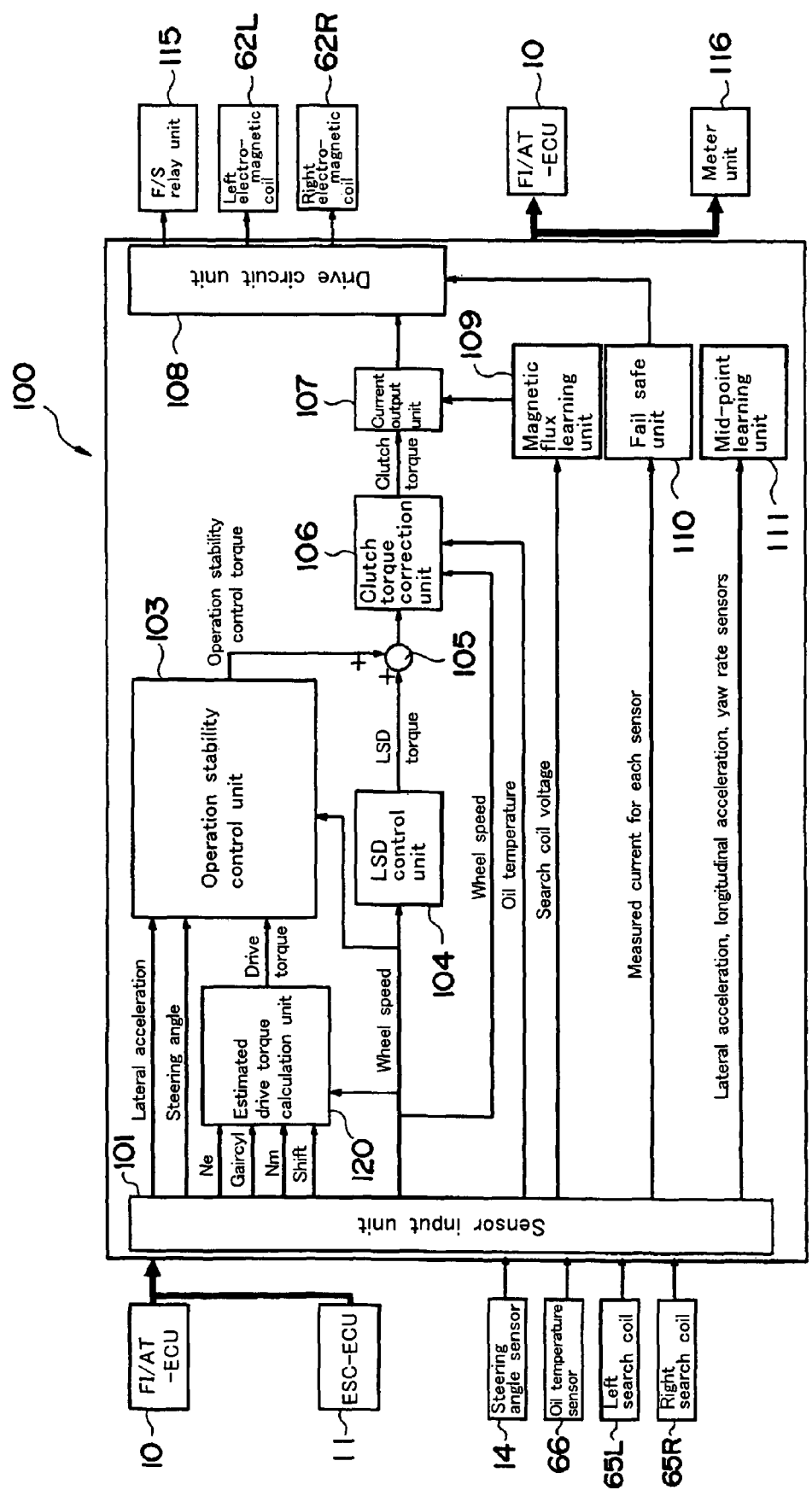
FIG. 5 is a control block diagram of the 4WD-ECU.

The following is an explanation of the 4WD-ECU 100 with reference to FIG. 5. As shown in FIG. 5, information can be input from the FI/AT-ECU 10 and the ESC-ECU 11 to a sensor input unit 101 of the 4WD-ECU 100 using what is called a controller area network (CAN). The information input by the FI/AT-ECU 10 includes the engine rotation speed Ne (engine ENG output shaft 37 rotation speed) measured by the engine rotation speed measurement sensor 45, the cylinder intake air amount Gaircyl, the speed of rotation Nm of the main shaft 55 of the torque converter 51 measured by the main shaft rotation speed measurement sensor 46, the shift position of the shift lever (not shown in the drawings, and so on). Also, the information input from the ESC-ECU 11 includes wheel speeds (rotation speed of each wheel) measured by the wheel speed sensors 13, the yaw rate measured by the yaw rate sensor 15, the lateral acceleration measured by the lateral acceleration sensor 16, the longitudinal acceleration measured by the longitudinal acceleration sensor 17, and so on.

The cylinder intake air amount Gaircyl, which is the amount of air into the engine ENG, is calculated from the following formula (1) by the FI/AT-ECU 10.

$$Gaircyl = Gairth - \frac{\Delta P3 \cdot V3}{R \cdot TA} \cdot KV3 - \frac{\Delta PB \cdot VB}{R \cdot TA} \cdot KINVO \quad (1)$$

Where Gairth is the air amount measured by the air flow meter 41, $\Delta P3$ is the variation per unit time of the pressure measured by the first pressure sensor 42, $\Delta PB$ is the variation per unit time of the pressure measured by the second pressure sensor 43, V3 is the volume of air flowing between the compressor 32 and the throttle 34, VB is the volume of air flowing within the intake manifold 35, and TA is the temperature of the air taken into the engine ENG. Also, R is the gas constant, and KV3 and KINVO are adjustment gains.

Also, the steering angle measured by the steering angle sensor 14, the oil temperature within the drive power control device 60 measured by the oil temperature sensor 66, the voltage value measured by the left search coil 65L, the voltage value measured by the right search coil 65R, and so on, are input to the sensor input unit 101.

The engine rotation speed Ne, the cylinder intake air amount Gaircyl, the rotation speed Nm of the main shaft 55, the shift position, and the wheel speeds (speed of rotation of each wheel) are input to an estimated drive torque calculation unit 120 from the sensor input unit 101. The estimated drive torque calculation unit 120 calculates the estimated drive torque by the engine ENG, based on the input data, and outputs the calculated estimated drive torque to an operation stability control unit 103.

The engine ENG estimated drive torque output from the estimated drive torque calculation unit 120, and the lateral acceleration, the steering angle, wheel speed (rotation speed of each wheel) output from the sensor input unit 101 are input to the operation stability control unit 103. The operation stability control unit 103 calculates the operation stability control torque based on the input data, and outputs the operation stability control torque to a torque addition unit 105. Also, the wheel speed (rotation speed of each wheel) is input from the sensor input unit 101 to an LSD control unit 104. The LSD control unit 104 calculates the LSD torque based on the wheel speeds, and outputs the calculated LSD torque to the torque addition unit 105.

The operation stability control torque and the LSD torque are added in the torque addition unit 105, and the added torque is input to the clutch torque correction unit 106. Based on the torque value input from the torque addition unit 105, the wheel speeds input from the sensor input unit 101, and the oil temperature within the drive power control device 60, the clutch torque correction unit 106 calculates the clutch torque to be generated by the drive power control device 60, and outputs the calculated clutch torque to a current output unit 107.

To obtain the clutch torque calculated by the clutch torque correction unit 106, the current output unit 107 calculates the drive current value of the left electromagnetic coil 62L and the right electromagnetic coil 62R, and outputs the calculated current values to the drive circuit unit 108. Then the drive circuit unit 108 outputs drive current to the left electromagnetic coil 62L and the right electromagnetic coil 62R so that the current values calculated by the current output unit 107 is obtained. In this way, the drive current is output to each electromagnetic coil 62L, 62R of the drive power control device 60 from the 4WD-ECU 100, and power is distributed to the front wheels 2L, 2R and the rear wheels 3L, 3R.

A magnetic flux learning unit 109 calculates current correction values to correct the left electromagnetic coil 62L and the right electromagnetic coil 62R drive current values, based on the search coil voltage input from the sensor input unit 101. The calculated current correction values are output to the current output unit 107. Then the drive current values are corrected in the current output unit 107 in order to obtain the required electromagnetic force in the left and right electromagnetic coils 62L, 62R.

Also, the values of the measured current or the like from each sensor are input from the sensor input unit 101 to a fail safe unit 110. In the event of a breakdown or other predetermined conditions, the fail safe unit 110 outputs a fail safe signal to the drive circuit unit 108. When a fail safe signal is input to the drive circuit unit 108, a relay drive current is output from the drive circuit unit 108 to an F/S relay unit 115. The F/S relay unit 115 operates so that drive current does not flow to the left and right electromagnetic coils 62L, 62R. Furthermore, the 4WD-ECU 100 outputs a torque down request signal to the FI/AT-ECU 10, and an alarm light display signal is output to a meter unit 116.

Also, the yaw rate, lateral acceleration, and longitudinal acceleration are input to a midpoint learning unit 111. The midpoint learning unit 111 learns the midpoints of the yaw rate sensor 15, lateral acceleration sensor 16, and longitudinal acceleration sensor 17.

Figure 6:
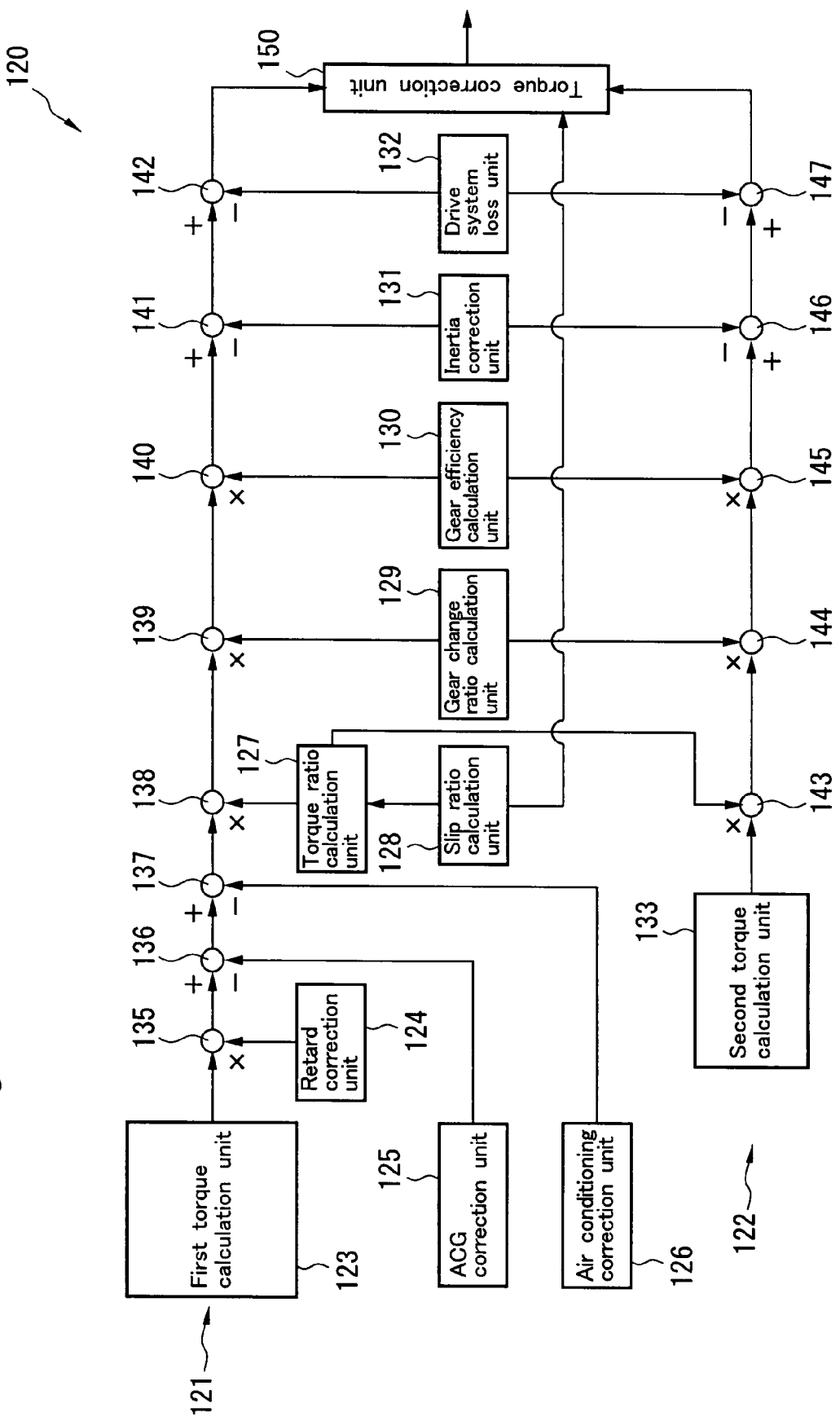
FIG. 6 is a control block diagram of the estimated drive torque calculation unit.

Next, the estimated drive torque calculation unit 120, which is the drive torque estimation device according to the present invention, is explained with reference to FIG. 1 and FIG. 6. As shown in FIG. 6, the estimated drive torque calculation unit 120 mainly includes a first drive torque calculation unit 121, a second drive torque calculation unit 122, and a torque correction unit 150. The first drive torque calculation unit 121 calculates the first estimated drive torque. The second drive torque calculation unit 122 calculates the second estimated drive torque. The torque correction unit 150 corrects the estimated drive torque, and outputs the corrected drive torque to the operation stability control unit 103.

The first drive torque calculation unit 121 mainly includes a first torque calculation unit 123 that calculates the engine ENG drive torque alone based on the cylinder intake air amount Gaircyl. The first torque calculation unit 123 uses an Ne-Gair map, which is an engine torque map, to calculate the estimated drive torque of the engine ENG on its own from the engine speed of rotation Ne and the cylinder intake air amount Gaircyl input from the sensor input unit 101. The calculated estimated drive torque of the engine ENG alone is output to a first calculation unit 135.

The first calculation unit 135 multiplies the estimated drive torque input from the first torque calculation unit 123 by a retard correction value input from a retard correction unit 124, and outputs the result to a second calculation unit 136. The retard correction unit 124 calculates a retard correction value that corrects for the reduction in engine ENG output (drive torque) due to delaying the engine ENG ignition timing, and outputs the retard correction value to the first calculation unit 135.

The second calculation unit 136 subtracts an ACG correction value input from an ACG correction unit 125 from the estimated drive torque input from the first calculation unit 135, and outputs the result to a third calculation unit 137. The ACG correction unit 125 calculates the ACG correction value that corrects for the reduction in engine ENG output (drive torque) due to operation of a generator (alternator), and outputs the result to the second calculation unit 136.

The third calculation unit 137 subtracts an air conditioning correction value input from an air conditioning correction unit 126 from the estimated drive torque input from the second calculation unit 136, and outputs the result to a fourth calculation unit 138. The air conditioning correction unit 126 calculates the air conditioning correction value that corrects for the reduction in engine ENG output (drive torque) due to operation of an air conditioner, and outputs the result to the third calculation unit 137.

The fourth calculation unit 138 multiplies the estimated drive torque input from the third calculation unit 137 by a torque input/output ratio input from a torque ratio calculation unit 127, and outputs the result to a fifth calculation unit 139. The torque ratio calculation unit 127 calculates the torque input/output ratio, which is the ratio of the input torque and output torque of the torque converter 51, based on the slip ratio of the torque converter 51 input from a slip ratio calculation unit 128. The calculated torque input/output ratio is output to the fourth calculation unit 138 and a ninth calculation unit 143 that is described later. The slip ratio calculation unit 128 calculates the torque converter 51 slip ratio from the engine speed of rotation Ne (in other words, the speed of rotation of the input shaft of the torque converter 51) input from the sensor input unit 101, and the main shaft 55, which is the torque converter 51 output shaft, speed of rotation Nm, and outputs the result to the torque ratio calculation unit 127 and the torque correction unit 150. The slip ratio of the torque converter 51 is Nm/Ne (×100%).

The fifth calculation unit 139 multiplies the estimated drive torque input from the fourth calculation unit 138 by a gear change ratio input from a gear change ratio calculation unit 129, and outputs the result to a sixth calculation unit 140. The gear change ratio calculation unit 129 calculates the gear change ratio of the automatic transmission AT (gear train 58) set in accordance with the shift position, based on the shift position input from the sensor input unit 101. The calculated gear change ratio is output to the fifth calculation unit 139 and a tenth calculation unit 144 that is described later.

The sixth calculation unit 140 multiplies the estimated drive torque input from the fifth calculation unit 139 by a gear efficiency input from a gear efficiency calculation unit 130, and outputs the result to a seventh calculation unit 141. The gear efficiency calculation unit 130 calculates the gear efficiency (transmission efficiency) of the automatic transmission AT set in accordance with the shift position, based on the shift position input from sensor input unit 101. The calculated gear efficiency is output to the sixth calculation unit 140 and an eleventh calculation unit 145 that is described later.

The seventh calculation unit 141 subtracts an inertia correction value input from an inertia correction unit 131 from the estimated drive torque input from the sixth calculation unit 140, and outputs the result to an eighth calculation unit 142. The inertia correction unit 131 calculates the inertia correction value corresponding to the shift position, based on the shift position input from the sensor input unit 101, and outputs the calculated inertia correction value to the seventh calculation unit 141 and a twelfth calculation unit 146 that is described later.

The eighth calculation unit 142 subtracts a drive system loss correction value input from a drive system loss unit 132 from the estimated drive torque input from the seventh calculation unit 141, and outputs the result to the torque correction unit 150. In this way, the first drive torque calculation unit 121 calculates the first estimated drive torque output from the output shaft of the automatic transmission AT, by adjusting the estimated drive torque of the engine ENG alone, calculated based on the cylinder intake air amount Gaircyl, for gear change ratio and other correction values. The calculated first estimated drive-torque is output to the torque correction unit 150.

The second drive torque calculation unit 122 mainly includes a second torque calculation unit 133 that calculates the estimated drive torque of the engine ENG alone based on the engine speed of rotation Ne (the speed of rotation of the engine output shaft 37). The second torque calculation unit 133 calculates the estimated drive torque of the engine ENG alone using Formula (2), which is a rotational energy formula. The calculated estimated drive torque of the engine ENG is output to the ninth calculation unit 143.

$$\text{Erot} = J \times \text{Ne}^2 / 182.4 \quad (2)$$

Where, Erot is the estimated drive torque of the engine ENG alone, and J is the moment of inertia.

The ninth calculation unit 143 multiplies the estimated drive torque input from the second torque calculation unit 133 by the torque input/output ratio input from the torque ratio calculation unit 127, and outputs the result to the tenth calculation unit 144. Next, the tenth calculation unit 144 multiplies the estimated drive torque input from the ninth calculation unit 143 by the gear change ratio input from the gear change ratio calculation unit 129, and outputs the result to the eleventh calculation unit 145.

Next, the eleventh calculation unit 145 multiplies the estimated drive torque input from the tenth calculation unit 144 by the gear efficiency input from the gear efficiency calculation unit 130, and outputs the result to the twelfth calculation unit 146. Next, the twelfth calculation unit 146 subtracts the inertia correction value input from the inertia correction unit 131 from the estimated drive torque input from the eleventh calculation unit 145, and outputs the result to a thirteenth calculation unit 147.

Then the thirteenth calculation unit 147 subtracts the drive system loss correction value input from the drive system loss unit 132 from the estimated drive torque input from the twelfth calculation unit 146, and outputs the result to the torque correction unit 150. In this way, the second drive torque calculation unit 122 calculates the second estimated drive torque output from the output shaft of the automatic transmission AT, by adjusting the estimated drive torque of the engine ENG alone, calculated based on the engine speed of rotation Ne, for gear change ratio and other correction values. The calculated second estimated drive torque is output to the torque correction unit 150.

Figure 1:
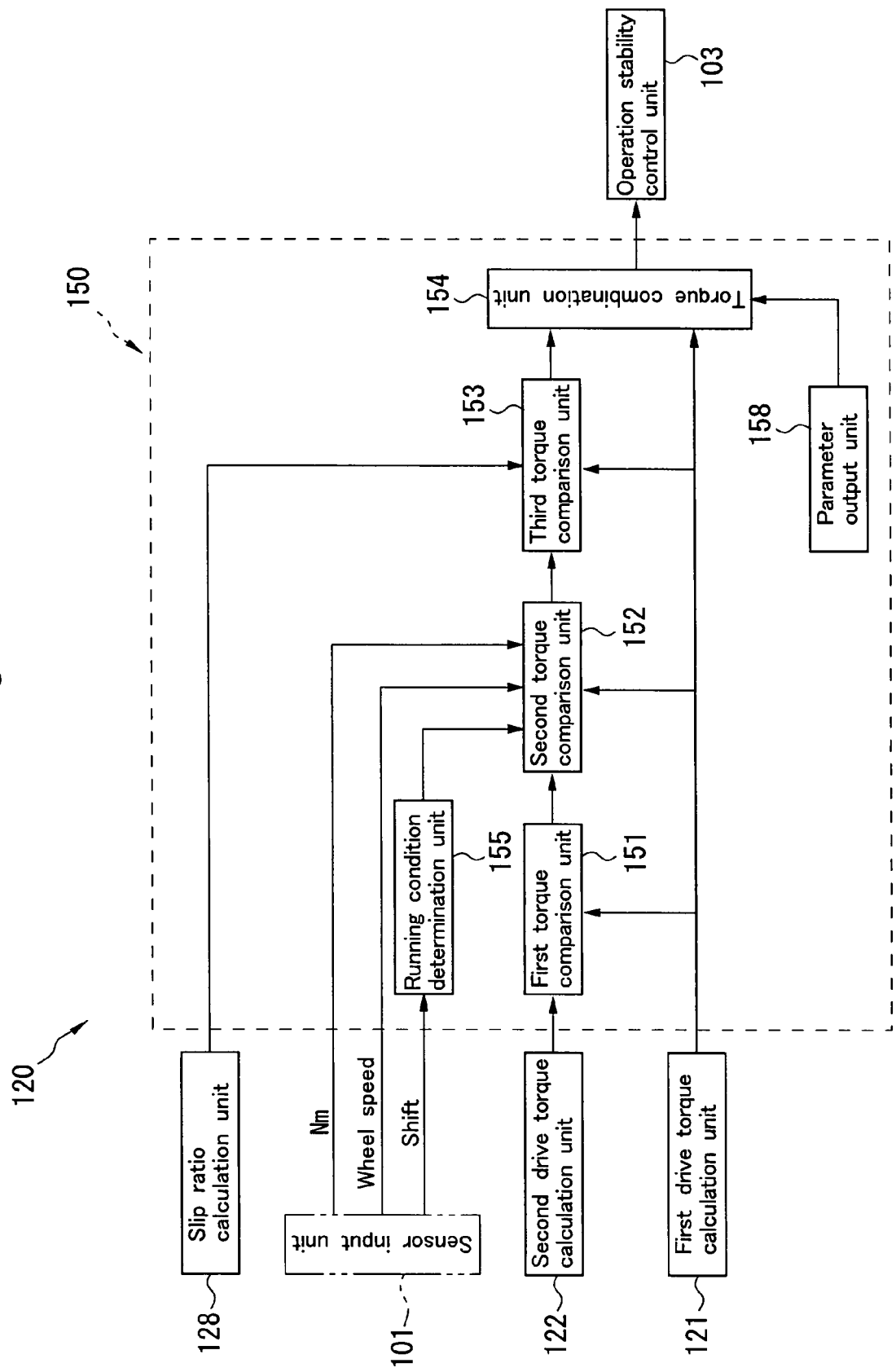
FIG. 1 is a control block diagram of the torque correction unit that forms part of the estimated drive torque calculation unit.

As shown in FIG. 1, the torque correction unit 150 mainly includes a first torque comparison unit 151, a second torque comparison unit 152, a third torque comparison unit 153, and a torque combination unit 154. The first estimated drive torque output from the first drive torque calculation unit 121 and the second estimated drive torque output from the second drive torque calculation unit 122 are input to the first torque comparison unit 151. Then the first torque comparison unit 151 compares the first estimated drive torque and the second estimated drive torque, and outputs the smaller estimated drive torque to the second torque comparison unit 152.

The estimated drive torque output from the first torque comparison unit 151, the first estimated drive torque output from the first drive torque calculation unit 121, the determination result output from a running condition determination unit 155, the speed of rotation Nm of the main shaft 55 output from the sensor input unit 101, and the wheel speeds (for example, the rotation speed of the rear wheels 3L, 3R) are input to the second torque comparison unit 152. The running condition determination unit 155 determines whether the gear train 58 is in gear or not, based on the shift position, which is input from the sensor input unit 101, of the shift lever (which is not shown on the drawings) (and the engine speed of rotation Ne and the wheel speeds). The determination result is output to the second torque comparison unit 152. The in gear state means shift positions apart from the neutral and parking states (in other words, states in which either forward or reverse gear change steps are connected).

Then, if the running condition determination unit 155 determines that the gear train 58 is in the in gear state, and if the speed of rotation Nm of the main shaft 55 is zero (including if there is no sensor output), and if the rotation speed of the rear wheels 3L, 3R (wheel speed) is equal to or greater than a predetermined rotation speed (for example, 5, rpm), the second torque comparison unit 152 outputs the first estimated drive torque input from the first drive torque calculation unit 121 to the third torque comparison unit 153. To take account of measurement errors and the like of each sensor, it is preferable that the second torque comparison unit 152 outputs the first estimated drive torque input from the first drive torque calculation unit 121 to the third torque comparison unit 153 after the above condition continues for about 10, counts. On the other hand, for conditions apart from the above, in other words when the running condition determination unit 155 determines that the gear train 58 is not in the in gear state, or if the speed of rotation Nm of the main shaft 55 is greater than zero, or if the rotation speed of the rear wheels 3L, 3R (wheel speed) is less than the predetermined rotation speed, the estimated drive torque input from first torque comparison unit 151 is output to the third torque comparison unit 153.

The estimated drive torque output from the second torque comparison unit 152, the first estimated drive torque output from the first drive torque calculation unit 121, and the slip ratio of the torque converter 51 output from the slip ratio calculation unit 128 are input to the third torque comparison unit 153. Then, if the input slip ratio is equal to or less than a predetermined value (for example, 60%), the estimated drive torque input from the second torque comparison unit 152 is output to the torque combination unit 154. If the input slip ratio is greater than the predetermined value, the first estimated drive torque input from the first drive torque calculation unit 121 is output to the torque combination unit 154.

The estimated drive torque output from the third torque comparison unit 153, the first estimated drive torque output from the first drive torque calculation unit 121, and calculation parameters output from a parameter calculation unit 158 are input to the torque combination unit 154. The calculation parameters output by the parameter output unit 158 are the proportions for combining the estimated drive torque input from the third torque comparison unit 153 and the first estimated drive torque input from the first drive torque calculation unit 121. In the present embodiment, the proportion of the estimated drive torque input from the third torque comparison unit 153 is 0.45, and the proportion of the first estimated drive torque input from the first drive torque calculation unit 121 is 0.55. Then the torque combination unit 154 calculates the combination drive torque by adding the value obtained by multiplying the estimated drive torque input from the third torque comparison unit 153 by 0.45, and the value obtained by multiplying the first estimated drive torque input from the first drive torque calculation unit 121 by 0.55. The calculated combination drive torque is output to the operation stability control unit 103 as the engine ENG estimated drive torque output at the output shaft of the automatic transmission AT.

The following is an explanation of the drive torque estimation method according to the estimated drive torque calculation unit 120 configured in this way. First, the first drive torque calculation unit 121 calculates the first estimated drive torque based on the cylinder intake air amount Gaircyl, as explained previously, and the calculated first estimated drive torque is output to the torque correction unit 150. In parallel with this, the second drive torque calculation unit 122 calculates the second estimated drive torque based on the engine speed of rotation Ne, as explained previously, and the calculated second estimated drive torque is output to the torque correction unit 150. Also at this time, the slip ratio calculation unit 128 calculates the torque converter 51 slip ratio as described previously. The calculated slip ratio is output to the torque correction unit 150. Furthermore, the speed of rotation Nm of the main shaft 55, the shift position, and the rotation speed of each wheel (wheel speed) is input to the torque correction unit 150 from the sensor input unit 101.

Next, in the torque correction unit 150, the first estimated drive torque and the second estimated drive torque are compared by the first torque comparison unit 151, and the smaller of the two estimated drive torques is output to the second torque comparison unit 152.

Next, if the running condition determination unit 155 determines that the gear train 58 is in gear, and if speed of rotation Nm of the main shaft 55 is zero (including the case that there is no sensor output), and if the rotation speed of the rear wheels 3L, 3R (wheel speed) is equal to or greater than a predetermined rotation speed (for example, 5, rpm), the second torque comparison unit 152 outputs the first estimated drive torque to the third torque comparison unit 153. On the other hand, when the running condition determination unit 155 determines that the gear train 58 is not in the in gear state, or if the speed of rotation Nm of the main shaft 55 is greater than zero, or if the rotation speed of the rear wheels 3L, 3R (wheel speed) is less than the predetermined rotation speed, the second torque comparison unit 152 outputs the estimated drive torque input from first torque comparison unit 151 to the third torque comparison unit 153.

Next, if the slip factor of the torque converter 51 is less than a predetermined value (for example, 60%), the third torque comparison unit 153 outputs the estimated drive torque input from the second torque comparison unit 152 to the torque combination unit 154. If the slip factor is greater than the predetermined value, the first estimated drive torque is output to the torque combination unit 154. In other words, when the running condition determination unit 155 determines that the gear train 58 is not in the in gear state, or if the speed of rotation Nm of the main shaft 55 is greater than zero, or if the rotation speed of the rear wheels 3L, 3R (wheel speed) is less than the predetermined rotation speed, if the slip ratio of the torque converter 51 is equal to or less than a predetermined value, and if the first estimated drive torque is greater than the second estimated drive torque, the third torque comparison unit 153 outputs the second estimated drive torque to the torque combination unit 154. On the other hand, if the slip ratio of the torque converter 51 is greater than the predetermined value, or if the first estimated drive torque is smaller than the second estimated drive torque, the third torque comparison unit 153 outputs the first estimated drive torque to the torque combination unit 154.

Also, if the running condition determination unit 155 determines that the gear train 58 is in gear, and if speed of rotation Nm of the main shaft 55 is zero, and if the rotation speed of the rear wheels 3L, 3R (wheel speed) is equal to or greater than the predetermined rotation speed, if the slip ratio of the torque converter 51 is equal to or less than the predetermined value, or the first estimated drive torque is greater than the second estimated drive torque, the third torque comparison unit 153 outputs the first estimated drive torque to the torque combination unit 154.

Then the torque combination unit 154 calculates the combination drive torque by adding the value obtained by multiplying the estimated drive torque input from the third torque comparison unit 153 by 0.45, and the value obtained by multiplying the first estimated drive torque input from the first drive torque calculation unit 121 by 0.55. The calculated combination drive torque is output to the operation stability control unit 103 as the engine ENG estimated drive torque output at the output shaft of the automatic transmission AT. In other words, when the slip ratio of the torque converter 51 is equal to or less than the predetermined value, and the first estimated drive torque is greater than the second estimated drive torque, the second estimated drive torque is input from the third torque comparison unit 153 to the torque combination unit 154. Therefore, the torque combination unit 154 calculates the engine ENG estimated drive torque to be the combination drive torque by adding the value obtained by multiplying the second estimated drive torque by 0.45, and the value obtained by multiplying the first estimated drive torque by 0.55.

However, the first estimated drive torque calculated by the first drive torque unit 121 is a value that is much greater than the actual drive torque when the vehicle 1 is starting up. Therefore, if drive power distribution to the front wheels 2L, 2R and the rear wheels 3L, 3R is carried out based on the first estimated drive torque alone, the drive power distribution at vehicle 1 start up will not be appropriate, so there is a possibility of unstable running.

On the other hand, the second estimated drive torque calculated by the second drive torque calculation unit 122 can provide a very accurate torque estimate when the vehicle is starting up. However, if drive power distribution to the front wheels 2L, 2R and the rear wheels 3L, 3R is carried out based on the second estimated drive torque alone, because of the delay in the physical response of the electromagnetic coils 62L, 62R (actuators) that control the engagement force of the multiple disk type brake clutches 61L, 61R, the actual control torque (clutch torque) is delayed. Therefore, even though the torque can be estimated with good accuracy, the intended distribution ratio cannot be obtained. Therefore, the drive power distribution will be inappropriate on low μ surfaces (low coefficient of friction surfaces). Therefore, the amount of tire slip will increase, and the running stability of the vehicle 1 could be reduced.

Therefore, as stated above, assuming the vehicle 1 is starting, if the slip ratio of the torque converter 51 is equal to or less than a predetermined value, and if the first estimated drive torque is greater than the second estimated drive torque, the first estimated drive torque and the second estimated drive torque are combined in a predetermined proportion, so the second estimated drive torque is not used alone. With the second estimated drive torque alone, there is concern over the effect of the delay in the response of the electromagnetic coils 62L, 62R (actuators) that control the engagement force of the multiple disk type brake clutches 61L, 61R. Therefore it is possible to calculate an estimated drive torque that compensates for the delay in the response of the electromagnetic coils 62L, 62R. Therefore it is possible to improve the running stability of the four-wheel drive vehicle 1 while maintaining high torque estimation accuracy.

Furthermore, it is preferable that the predetermined proportion of the first estimated drive torque is greater than the predetermined proportion of the second estimated drive torque. Specifically, it is preferable that the predetermined proportion of the first estimated drive torque is 0.55,, and the predetermined proportion of the second estimated drive torque is 0.45. In this way, the first estimated drive torque and the second estimated drive torque are appropriately combined. Therefore it is possible to improve the running stability of the four-wheel drive vehicle 1 while maintaining high torque estimation accuracy. Also, the proportion of the first estimated drive torque is greater than the proportion of the second estimated drive torque. Therefore it is possible to minimize the delay in the response of the electromagnetic coils 62L. 62R (actuators). Therefore it is possible to omit delay compensation for the delay in the response in the control logic.

Also, in the four-wheel drive vehicle 1 having an engine with a supercharger, by using the estimated drive torque calculation unit 120 according to the present embodiment, it is possible to effectively compensate for errors in the first estimated drive torque caused by sudden fluctuations in the intake air amount of the supercharged engine during start up. Therefore it is possible to effectively improve the torque estimation accuracy.

However, if the running condition determination unit 155 determines that the gear train 58 is in gear, and if speed of rotation Nm of the main shaft 55 is zero, and if the rotation speed of the rear wheels 3L, 3R (wheel speed) is equal to or greater than the predetermined rotation speed, if the slip ratio of the torque converter 51 is equal to or less than the predetermined value, or the first estimated drive torque is greater than the second estimated drive torque, the third torque comparison unit 153 outputs the first estimated drive torque to the torque combination unit 154. Therefore, the torque combination unit 154 calculates the value obtained by adding the value obtained by multiplying the first estimated drive torque by 0.45, and the value obtained by multiplying the first estimated drive torque by 0.55. In other words, the estimated engine ENG drive torque is calculated to be (100% of) the first estimated drive torque.

The main shaft rotation speed measurement sensor 46 measures the speed of rotation Nm of the main shaft 55. In other words the main shaft rotation speed measurement sensor 46 measures the speed of rotation of the output shaft of the torque converter 55, which is necessary for calculation of the estimated drive torque (slip ratio). Even if there is a breakdown of the main shaft rotation speed measurement sensor 46, and the measured speed of rotation Nm of the main shaft 55 becomes zero, the first estimated drive torque can be estimated with comparatively good accuracy. Therefore by using the first estimated drive torque the drive torque measurement accuracy can be maintained high, and stable drive torque distribution can be achieved. Therefore, the running stability of the four-wheel drive vehicle 1 can be improved.

If the slip ratio of the torque converter 51 is greater than the predetermined value, or if the first estimated drive torque is smaller than the second estimated drive torque, the first estimated drive torque is input to the torque combination unit 154 from the third torque comparison unit 153. Therefore, the torque combination unit 154 calculates the value obtained by adding the value obtained by multiplying the first estimated drive torque by 0.45, and the value obtained by multiplying the first estimated drive torque by 0.55. In other words, the estimated engine ENG drive torque is calculated to be (100% of) the first estimated drive torque. In this way, the engine ENG drive torque is estimated by the estimated drive torque unit 120.

According to the estimated drive torque calculation unit 120 configured as described above, and the drive torque estimation method used by the estimated drive torque calculation unit 120, if the gear train 58 is in gear, or if the speed of rotation of the output shaft of the torque converter 51 (in other words, the speed of rotation Nm of the main shaft 55) is zero, or if the rotation speed of the wheels (for example, the rear wheels 3L, 3R) is equal to or greater than the predetermined rotation speed, even if the slip ratio of the torque converter 51 is equal to or less than the predetermined value, or the first estimated drive torque is greater than the second estimated drive torque, the first estimated drive torque can be calculated as the engine ENG estimated drive torque. Therefore, even if means for measuring the speed of rotation of the output shaft of the torque converter 51 (in other words, the speed of rotation Nm of the main shaft 55), which is necessary for calculation of the estimated drive torque (slip ratio), has a breakdown, and the measured value of the speed of rotation of the torque converter 51 is zero, the first estimated drive torque can be estimated with comparatively good accuracy. Therefore by using the first estimated drive torque, the drive torque measurement accuracy can be maintained high, and stable drive torque distribution can be achieved. Therefore, the running safety of the vehicle can be improved.

Also, according to the four-wheel drive vehicle 1 of the present invention, drive power is distributed to the front wheels 2L, 2R and the rear wheels 3L, 3R based on the engine ENG estimated drive torque calculated according to the present embodiment. Therefore, the running safety of the of the four-wheel drive vehicle 1 can be improved.

In the present embodiment as described above, the first and second estimated drive torque were used to estimate the output torque of the output shaft of the automatic transmission AT. However, the present invention is not limited to this; the first estimated drive torque may be obtained from the value of the engine ENG estimated drive torque alone, calculated from the engine speed of rotation Ne and the cylinder intake air amount Gaircyl, corrected by the retard correction unit 124, the ACG correction unit 125, and the air conditioning correction unit 126. Also, the second estimated drive torque may be taken to be the engine ENG estimated drive torque alone, calculated based on the engine speed of rotation Ne.

Also, the present embodiment as described above includes a drive power control device 60 having left and right multiple disk type brake clutches 61L, 61R to distribute drive power to the front wheels 2L, 2R and the rear wheels 3L, 3R. However, the present invention is not limited to this, and the present invention may be applied to a four-wheel drive vehicle in which a single brake clutch of this type is provided at the middle portion of the propeller shaft.

Furthermore, in the present embodiment as described above, the proportions for combining the first estimated drive torque and the second estimated drive torque were 0.55, in the case of the first estimated drive torque and 0.45, in the case of the second estimated drive torque. However, the present invention is not limited to these values, and these proportions may be changed in accordance with the circumstances.

Also, in the present embodiment as described above, if the running condition determination unit 155 determines that the gear train 58 is in gear, or if speed of rotation Nm of the main shaft 55 is zero, or if the rotation speed of the rear wheels 3L, 3R (wheel speed) is equal to or greater than a predetermined rotation speed, if the slip ratio of the torque converter 51 is equal to or less than the predetermined value, or the first estimated drive torque is greater than the second estimated drive torque, the first estimated drive torque is calculated to be the engine ENG estimated drive torque. However, the present invention is not limited to this. For example, the speed of rotation Nm of the main shaft 55 need not be limited to zero, but the condition may be set to Nm equal to or less than a predetermined speed of rotation (for example, 100, rpm, or the speed of rotation of the main shaft 55 corresponding to the speed of rotation of the engine during idling). Also, the rotation speed of the front wheels 2L, 2R may be used instead of the rotation speed of the rear wheels 3L, 3R. Furthermore, the vehicle speed calculated based on the wheel speed may also be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 2006-128879, filed on May 8, 2006,, which is incorporated herein by reference.

What is claimed is:

1. A vehicle drive torque estimation device in a vehicle having an engine, a torque converter connected to the output shaft of the engine, and a transmission mechanism that changes the speed of the output rotation transmitted from the engine via the torque converter and transmits the result to wheels, the vehicle drive torque estimation device comprising:

first drive torque calculation means for calculating the engine estimated drive torque based on an amount of air taken into the engine;

second drive torque calculation means for calculating the engine estimated drive torque based on the speed of rotation of the output shaft of the engine;

slip ratio calculation means for calculating a slip ratio of the torque converter;

running condition determination means for determining whether the transmission mechanism is in gear or not;

rotation speed measurement means for measuring the speed of rotation of the output shaft of the torque converter;

wheel speed measurement means for measuring the rotation speed of the wheels; and torque combination means for calculating a combination drive torque by combining a first estimated drive torque calculated by the first drive torque calculation means and a second estimated drive torque calculated by the second drive torque calculation means in a predetermined proportion, wherein if the slip ratio calculated by the slip ratio calculation means is equal to or less than a predetermined value, and if the first estimated drive torque is greater than the second estimated drive torque, the torque combination means calculates the combination drive torque as the engine estimated drive torque, and wherein if the running condition determination means determines that the transmission mechanism is in gear, and if the speed of rotation of the output shaft of the torque converter measured by the rotation speed measurement means is equal to or less than a predetermined speed of rotation, and if the rotation speed of the wheels measured by the wheel speed measurement means is equal to or greater than a predetermined rotation speed, the torque combination means calculates the first estimated drive torque as the engine estimated drive torque even if the slip ratio is equal to or less than a predetermined value, and even if the first estimated drive torque is greater than the second estimated drive torque.

2. The vehicle drive torque estimation device according to claim 1, wherein the predetermined proportion used to calculate the combination drive torque by the torque combination means is such that the proportion of the first estimated drive torque is greater than the proportion of the second estimated drive torque.

3. The vehicle drive torque estimation device according to claim 1, wherein the predetermined speed of rotation that defines the speed of rotation of the output shaft of the torque converter is approximately zero, the predetermined rotation speed that defines the rotation speed of the wheels is 5, rpm, and the predetermined value that defines the slip ratio is 60%.

4. A four-wheel drive vehicle in which both front wheels and rear wheels are drive wheels, wherein drive power distribution is carried out to the front wheels and the rear wheels based on the engine estimated drive torque calculated by the vehicle drive torque estimation device according to claim 1.

5. A vehicle drive torque estimation method in a vehicle having an engine, a torque converter connected to the output shaft of the engine, and a transmission mechanism that changes the speed of the output rotation transmitted from the engine via the torque converter and transmits the result to wheels, the vehicle drive torque estimation method comprising the steps of:

calculating the engine estimated drive torque based on an amount of air taken into the engine;

calculating the engine estimated drive torque based on the speed of rotation of the output shaft of the engine;

calculating a slip ratio of the torque converter;

calculating a combination drive torque by combining a first estimated drive torque calculated based on the amount of air taken into the engine and a second estimated drive torque calculated based on the speed of rotation of the output shaft of the engine in a predetermined proportion; and calculating the combination drive torque as the engine estimated drive torque if the calculated slip ratio is equal to or less than a predetermined value, and if the first estimated drive torque is greater than the second estimated drive torque, the method further comprising the steps of:

determining whether the transmission mechanism is in gear or not;

measuring the speed of rotation of the output shaft of the torque converter;

measuring the rotation speed of the wheels; and calculating the first estimated drive torque as the engine estimated drive torque even if the slip ratio is equal to or less than a predetermined value and even if the first estimated drive torque is greater than the second estimated drive torque in the case where the transmission mechanism is in gear, the speed of rotation of the output shaft of the torque converter is equal to or less than a predetermined speed of rotation, and the rotation speed of the wheels is equal to or greater than a predetermined rotation speed.

6. The vehicle drive torque estimation method according to claim 5, wherein the predetermined proportion used to calculate the combination drive torque is such that the proportion of the first estimated drive torque is greater than the proportion of the second estimated drive torque.

7. The vehicle drive torque estimation method according to claim 5, wherein the predetermined speed of rotation that defines the speed of rotation of the output shaft of the torque converter is approximately zero, the predetermined rotation speed that defines the rotation speed of the wheels is 5, rpm, and the predetermined value that defines the slip ratio is 60%.

8. A four-wheel drive vehicle in which both front wheels and rear wheels are drive wheels, wherein drive power distribution is carried out to the front wheels and the rear wheels based on the engine estimated drive torque calculated by the vehicle drive torque estimation method according to claim 5.

* * * * *